United States Patent
Lush

(10) Patent No.: US 6,427,629 B1
(45) Date of Patent: Aug. 6, 2002

(54) COLLAPSIBLE FEEDER

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 0 days.

(21) Appl. No.: 09/915,774

(22) Filed: Jul. 26, 2001

(51) Int. Cl.[7] ............................................. A01K 61/02
(52) U.S. Cl. ...................... 119/52.1; 119/459; 119/460; 119/461; 119/470; 119/477; 119/499; 119/498; 119/52.2
(58) Field of Search ................................ 119/52.1, 459, 119/460, 461, 498, 499, 513, 51.4, 58, 67, 431, 470, 477

(56) References Cited

U.S. PATENT DOCUMENTS

| | | | | |
|---|---|---|---|---|
| 1,790,045 A | * | 1/1931 | Harvey | 119/52.1 |
| 2,216,511 A | * | 10/1940 | Copeman | 119/52.3 |
| 2,789,534 A | * | 4/1957 | Landgraf | 119/52.1 |
| 2,987,041 A | * | 6/1961 | Bard | 119/52.2 |
| 3,568,641 A | * | 3/1971 | Kilham | 119/57.8 |
| 3,602,196 A | * | 8/1971 | Tucci | 119/429 |
| 3,961,444 A | * | 6/1976 | Skaife | 220/8 |
| 4,019,462 A | * | 4/1977 | Palfalvy | 119/51.5 |
| 4,204,500 A | * | 5/1980 | Podjan | 119/57.8 |
| 4,829,934 A | * | 5/1989 | Blasbalg | 119/57.8 |
| 4,838,205 A | * | 6/1989 | Larson | 119/52.2 |
| 4,896,628 A | * | 1/1990 | Kadunce | 119/52.1 |
| 4,955,319 A | * | 9/1990 | Brucker | 119/52.2 |
| 4,977,859 A | * | 12/1990 | Kilham | 119/52.2 |
| 5,033,411 A | * | 7/1991 | Brucker | 119/52.2 |
| 5,062,388 A | * | 11/1991 | Kilham | 119/52.2 |
| 5,203,281 A | * | 4/1993 | Harwich | 119/57.9 |
| 5,361,723 A | * | 11/1994 | Burleigh | 119/52.3 |
| 5,413,069 A | * | 5/1995 | Currie | 119/52.2 |
| 5,479,881 A | * | 1/1996 | Lush | 119/57.8 |
| 5,975,015 A | * | 11/1999 | Runyon et al. | 119/52.1 |
| 6,047,661 A | * | 4/2000 | Lush et al. | 119/51.01 |
| 6,073,582 A | * | 6/2000 | Lush | 119/51.01 |

\* cited by examiner

*Primary Examiner*—Charles T. Jordan
*Assistant Examiner*—Stephen A. Holzen
(74) *Attorney, Agent, or Firm*—Thomte, Mazour & Niebergall; Dennis L. Thomte

(57) ABSTRACT

A collapsible feeder for birds, squirrels and the like is disclosed and comprises a feeder body including a base and a rim. A series of hollow body segments of graduated diameters extend upwardly from the base within the rim to form a feeder body. The segment of smallest diameter is joined to the base and has a plurality of feed outlet openings formed therein to enable feed from within the feeder body to pass outwardly therefrom onto the base inwardly of the rim. A feeder lid is removably positioned on the upper end of the segment of greatest diameter when the feeder body is in the extended position. The feeder lid is removably positioned on the upper end of the rim when the feeder body is in the collapsed position.

8 Claims, 3 Drawing Sheets

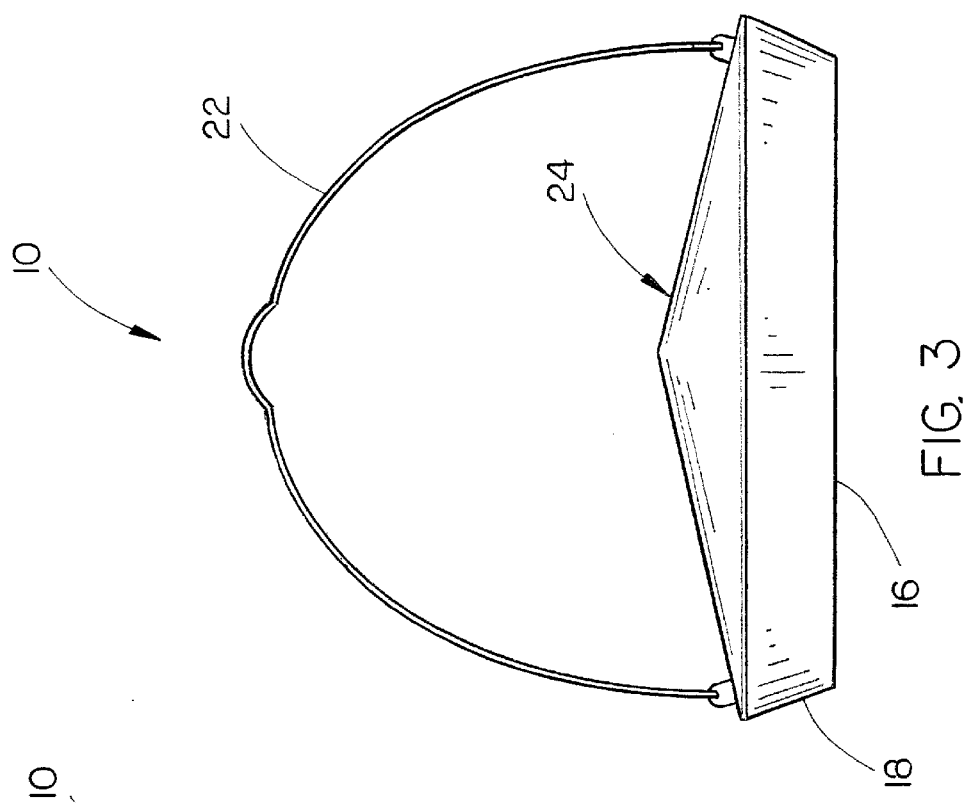
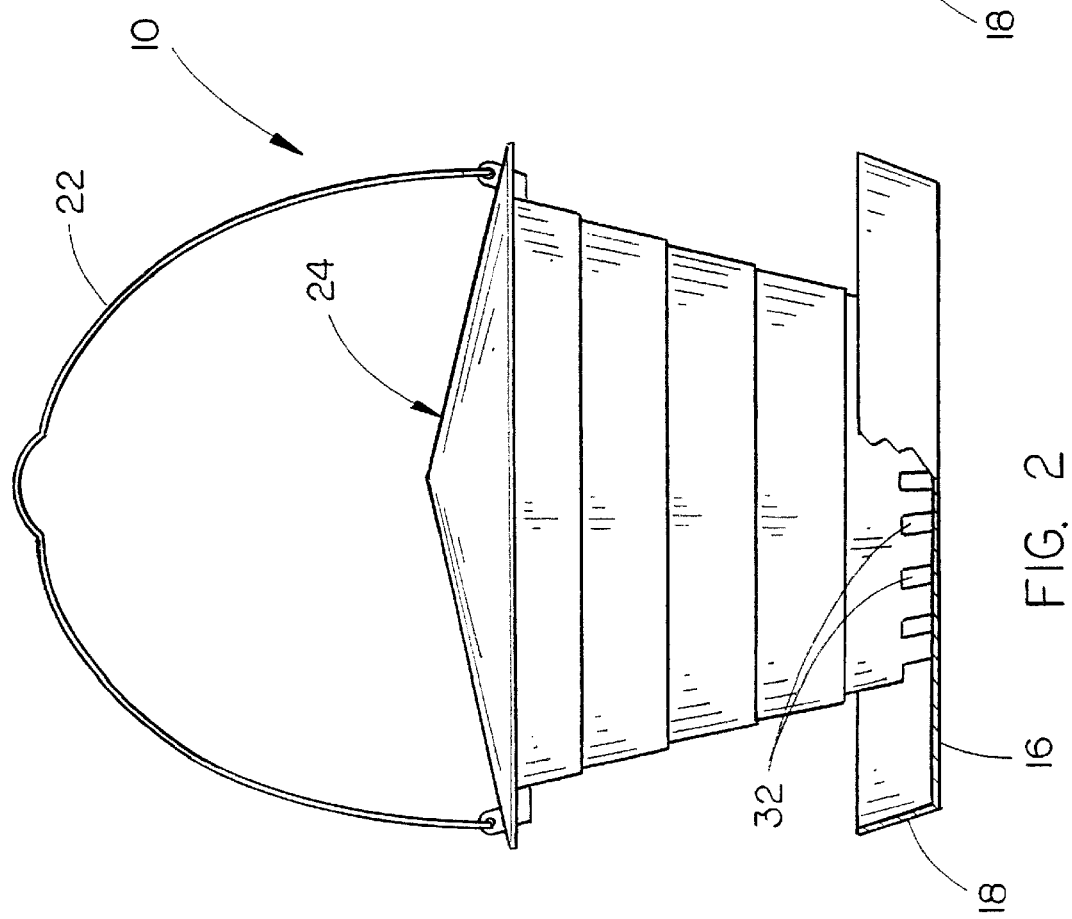

COLLAPSIBLE FEEDER

BACKGROUND OF THE INVENTION

1. Field of the Invention

This invention relates to a collapsible feeder and more particularly to a collapsible feeder for birds, squirrels and the like which is convenient to install, convenient for wild game to perch upon, and which is resistant to damage from squirrels and other feeding wildlife.

2. Description of the Related Art

Selectively collapsible containers are commonly used to hold seeds, suet and the like as food for wild animals such as birds, squirrels, etc. Many of the collapsible wild game feeders of the prior art are constructed from plastic polymer, natural fiber mesh or netting. Mesh or netting feeders have the advantage of not requiring a rod, dowel or other support for small birds, since the birds can perch on the mesh or net and feed at any exposed location on the feeder. Examples of mesh or net feeders of the prior art including the Thistle Pouch brand feeder manufactured by Havegard Farm, Inc. of Algoma, Wis., and Feather Friends E-Z Feeders brand wild bird feeder marketed by Canine's Choice of Marion, Ind. Other types of collapsible feeders are disclosed in U.S. Pat. Nos. 5,203,281; 4,706,871; and 4,026,025. Another type of collapsible wild game feeder is described in applicant's U.S. Pat. No. 5,479,881. The feeder of the '881 patent consists of a solid, weather-resistant bag fitted with openings at its base to allow attachment of rods for perching and access to the seed or other food contained in the bag.

Although many collapsible wild game feeders of the known art are convenient to install and highly attractive to wild game when they are first placed in use, none of the collapsible feeders of the known art are suitable for the feeding of squirrels or other large, aggressive feeding wildlife such as jays and monk parakeets. Squirrels and other large, aggressive feeding wildlife quickly tear the mesh of collapsible feeders of the known art and create holes through which the food spills from the feeder onto the ground below. Similarly, squirrels and large birds can easily enlarge the feeding openings or simply create new openings in the walls of the feeder of the '881 patent. After squirrels or large birds have damaged the net, webbing or walls of feeders of the known art, the food spills out and is no longer available to attract wildlife to the feeder. Further, the spilled feed creates additional problems by attracting mice and other pests that feed on the ground.

Wire mesh feeders constructed of rigid steel wire are also well-known to those skilled in the art of wild game feeding. The rigid steel wire mesh feeders are frequently used to hold blocks of suet or mixtures of seed, animal fat, peanut butter and the like. Although the rigid wire mesh feeders of the known art are resistant to chewing by squirrels and pecking by aggressive feeding birds, the rigid wire mesh feeders are not selectively collapsible for storage, shipment, etc. When the rigid wire mesh feeders are bent, dented, flattened or crushed, they cannot be expanded and reused without suffering metal fatigue and damage to their attachments, connections and welds. One further disadvantage of many collapsible feeders is that they are suited for only one size of feed.

In an effort to overcome the disadvantages of the prior art collapsible feeders, applicant previously designed collapsible feeders which are disclosed in U.S. Pat. Nos. 6,047,661 and 6,073,582. In the '661 and '582 patents, the mesh openings were designed to accommodate a specific seed size. The feeders of applicant's earlier patents truly represented a significant advance in the art and it is believed that the collapsible feeder described herein represents an improvement over applicant's earlier designs.

SUMMARY OF THE INVENTION

A collapsible feeder for birds, squirrels and the like is disclosed and includes a collapsible feeder body, having upper and lower ends, comprising a base and a rim, a series of hollow body members of graduated diameters which are extendible to form a feeder body, the segment of smallest diameter being joined to the base, the other segments being collapsible around the segment of smallest diameter inwardly of the rim. A feeder lid is removably positioned on the upper end of the segment of greatest diameter when the feeder body is in the extended position. The feeder lid is removably positioned on the upper end of the rim when the feeder body is in the collapsed position. A hanger is pivotally secured to the feeder lid for supporting the feeder branch, hanger, etc. The segment of smallest diameter has feed outlets formed therein so that feed in the feeder body may pass outwardly through the feed outlets onto the base inwardly of the rim. The feeder body may be annular, square, rectangular or any other suitable configuration. The feeder may be comprised of metal, plastic, glass or a combination of the same. The feeder can accommodate any kind of bird feed or even a mix of different seeds.

It is therefore a principal object of the invention to provide a selectively collapsible feeder for birds, squirrels and other wild game.

Yet another object of the invention is to provide a selectively collapsible feeder which is constructed of a metal, glass or plastic material or combinations thereof.

Still another object of the invention is to provide a selectively collapsible feeder which occupies a minimum of space for shipping and storage when empty.

Still another object of the invention is to provide a selectively collapsible feeder which is suitable for the feeding of both small perching birds in addition to squirrels, jays and other more aggressive feeding wildlife species.

These and other objects will be obvious to those skilled in the art.

BRIEF DESCRIPTION OF THE DRAWINGS

FIG. 2 is a side view of the feeder of this invention with a portion thereof cut away to more fully illustrate the invention;

FIG. 3 is a side view of the feeder in a collapsed position; and

DESCRIPTION OF THE PREFERRED EMBODIMENT

Figure 1:
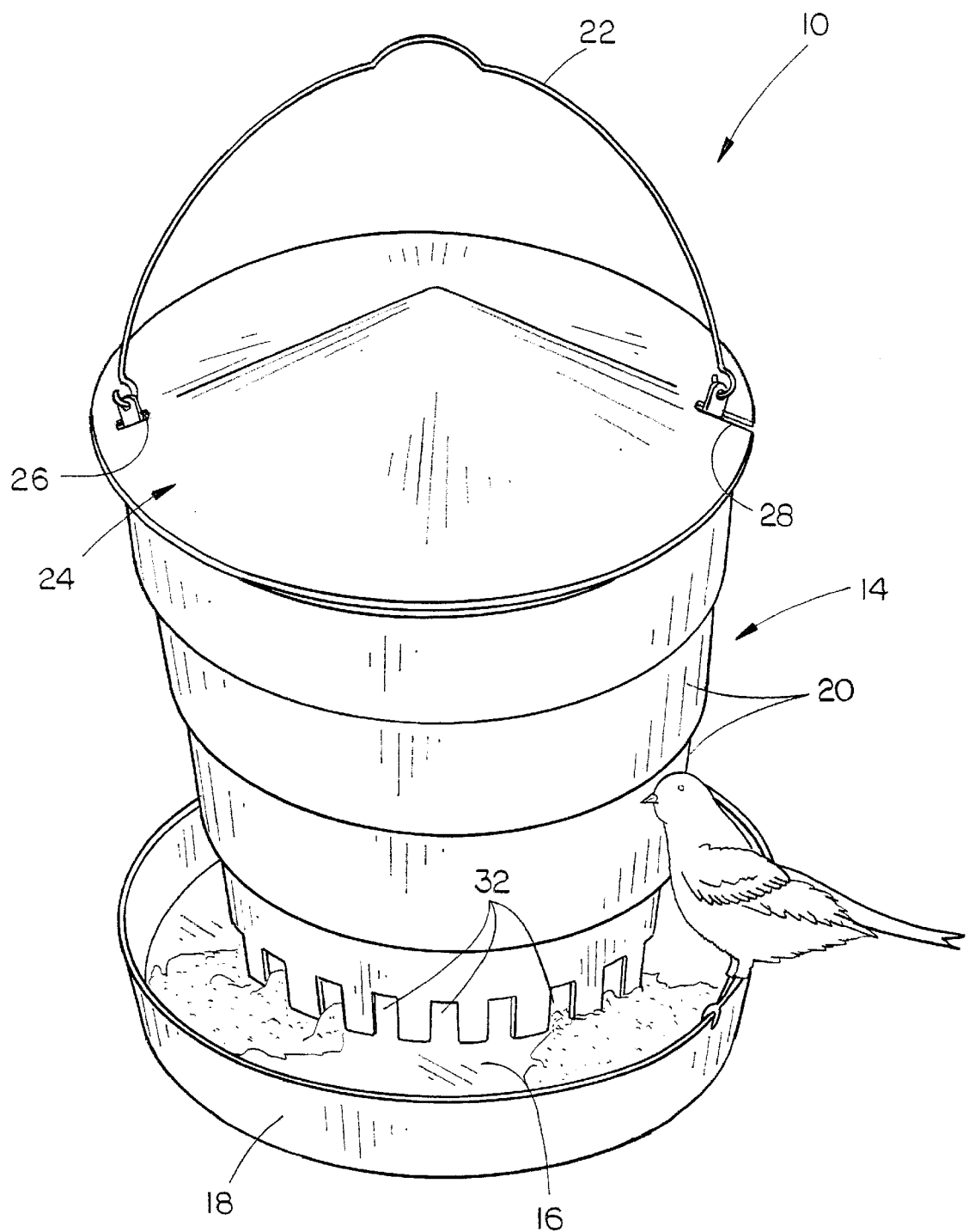
FIG. 1 is a perspective view of the collapsible feeder of this invention.
Figure 4:
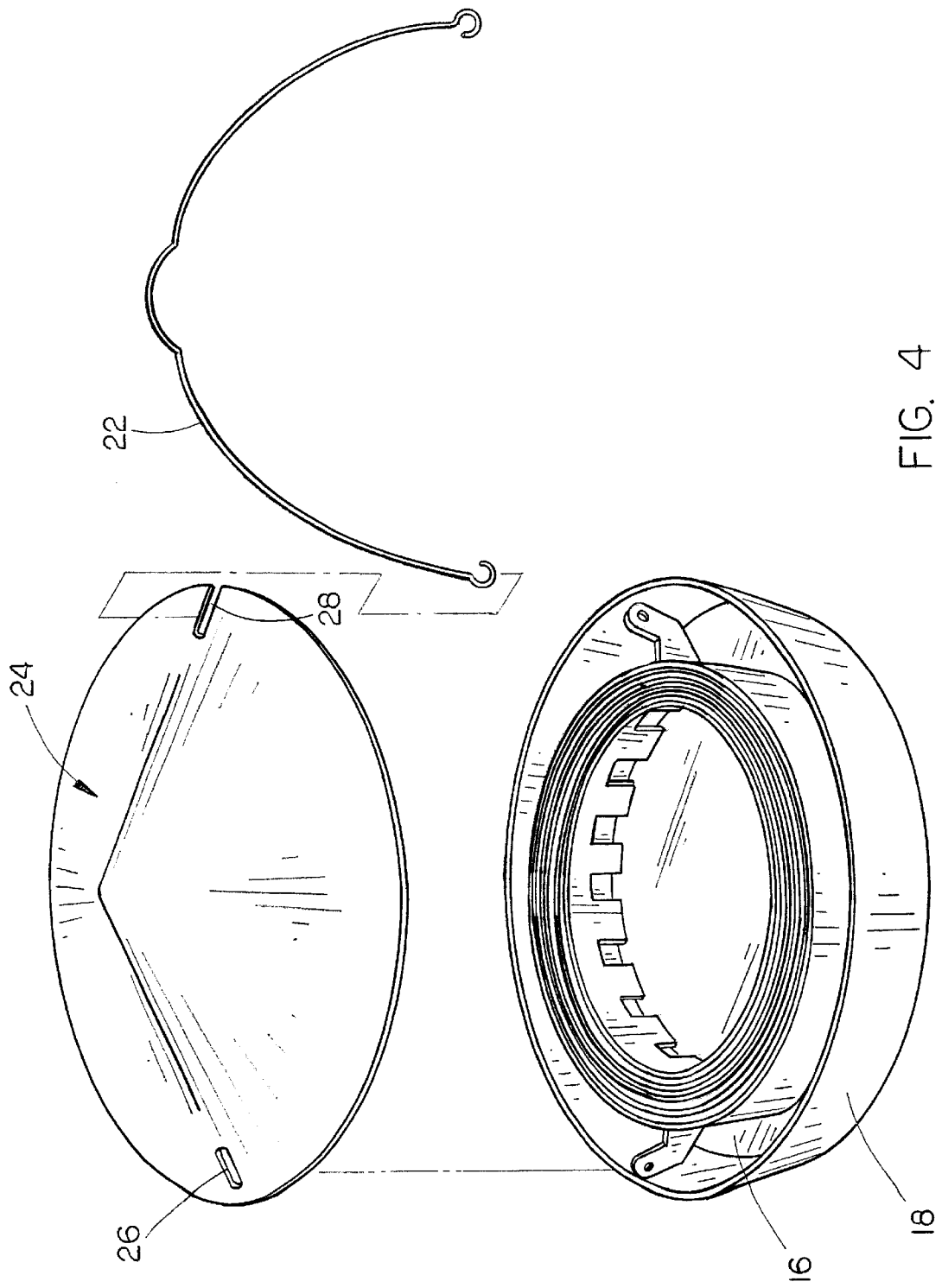
FIG. 4 is a perspective view of the feeder in a collapsed and disassembled condition.

The collapsible feeder of this invention is referred to generally by the reference numeral 10. Feeder 10 includes a feeder body 14 which has upper and lower ends. Feeder body 14 comprises a base 16 and a rim 18, and a series of hollow body segments 20 of graduated diameters which are extendible to form a feeder body. The segment of smallest diameter (the lowest segment 20) is joined to the base 16. The other segments 20 are collapsible around the lowermost segment of smallest diameter inwardly of the rim 18, as illustrated in FIG. 4. A hanger 22 is pivotally connected to the segment of greatest diameter (the uppermost segment 20) for supporting the feeder from a suitable support, branch, etc., as seen in FIG. 4. The numeral 24 refers to a cone-shaped lid having an opening 26 formed therein adjacent one side thereof and a slot 28 formed therein opposite to opening 26. One end of hanger 22 extends downwardly through opening 26, in the manner illustrated, which prevents separation of the lid from the feeder body. The other end of hanger 22 is received by the slot 28 to enable the lid to be easily raised so that feed may be placed in the interior of the feeder body 14. A plurality of feed outlet openings 32 are formed in the segment 20 of smallest diameter (the lowermost segment 20) to enable food within the feeder body to pass outwardly therethrough inwardly of the rim 18, as seen in FIG. 1.

The collapsible feeder of this invention will normally be in the collapsed position during shipment or storage with the configuration thereof occupying very little space in the collapsed position. When it is desired to move the feeder to its extended position for feeding purposes, the hanger 22 is moved upwardly with respect to the base 16 to cause the segments 20 to move to the extended position to form the feeder body. The close engagement of the segments 20 with one another prevents feed from passing downwardly therebetween. When feed is placed in the interior of the feeder body, a certain amount of the feed passes outwardly through the openings 32 onto the base 16 inwardly of the rim 18. The wild animals may perch on the rim 18 to feed, as seen in FIG. 1.

Although it is preferred that the base 16 and rim 18 be circular and that the segments 20 are ring-shaped or annular, the feeder could have a square shape, a rectangular shape or any other shape deemed desirable. It is preferred that the feeder of this invention be comprised of metal, but it could also be comprised of plastic or glass, or any combination thereof.

The feeder can accommodate any kind of bird feed or even a mix of different seeds.

It can therefore be seen that a novel bird feeder has been provided which may be collapsed for storage or shipment, but which may be extended for use. The bird feeder of this invention is extremely durable due to the construction thereof.

Thus it can be seen that the invention accomplishes at least all of its stated objectives.

I claim:

1. A collapsible feeder for birds and small rodents, comprising:

a collapsible feeder body, having upper and lower ends, comprising a base and a rim, a series of hollow body segments of graduated diameters which are extendible to form a feeder body, the segment of smallest diameter being joined to said base, the other segments being collapsible around the segment of smallest diameter inwardly of said rim;

said segment of smallest diameter having feed outlets formed therein whereby feed in the feeder body may pass outwardly through said feed outlets onto said base inwardly of said rim;

a hanger removably pivotally secured to the segment of greatest diameter; and and a feeder lid having first and second ends; said first end having an opening formed therein for receiving said hanger and preventing said first end from separating from said feeder body; said second end having a slot formed therein to enable said second end to be raised from said feeder body.

2. The collapsible feeder of claim 1 wherein said body segments are annular-shaped.

3. The collapsible feeder of claim 1 wherein said body segments are square-shaped.

4. The collapsible feeder of claim 1 wherein said body segments are rectangular-shaped.

5. The collapsible feeder of claim 1 wherein said feeder body is comprised of a metal material.

6. The collapsible feeder of claim 1 wherein said feeder body is comprised of a plastic material.

7. The collapsible feeder of claim 1 wherein said feeder body is comprised of a glass material.

8. The collapsible feeder of claim 1 wherein said feeder lid may be removably positioned on said rim when said feeder body is in the collapsed position.

* * * * *